ORIGINAL SCENE LIGHT VALUES

Fig.12b.

TRANSMITTED INFORMATION USING $E'_Y$

REPRODUCED LUMINANCE USING $E'_Y$

Fig.12c.

REPRODUCED LUMINANCE USING $E'_{Y_T}$

Fig.12d.

INVENTORS
WALTER G. GIBSON AND
ALFRED C. SCHROEDER

BY

ATTORNEY

Dec. 8, 1959  W. G. GIBSON ET AL  2,916,544
COLOR TELEVISION
Filed Aug. 10, 1955  6 Sheets-Sheet 3

INVENTORS
WALTER G. GIBSON AND
ALFRED C. SCHROEDER
BY
ATTORNEY

Dec. 8, 1959   W. G. GIBSON ET AL   2,916,544
COLOR TELEVISION
Filed Aug. 10, 1955   6 Sheets-Sheet 4

Fig. 6.

INVENTORS,
WALTER G. GIBSON &
ALFRED C. SCHROEDER
BY
ATTORNEY

Dec. 8, 1959 W. G. GIBSON ET AL 2,916,544
COLOR TELEVISION
Filed Aug. 10, 1955 6 Sheets-Sheet 5

INVENTORS
WALTER G. GIBSON &
ALFRED C. SCHROEDER
BY
ATTORNEY

United States Patent Office 2,916,544
Patented Dec. 8, 1959

2,916,544

COLOR TELEVISION

Walter G. Gibson, Princeton, N.J., and Alfred C. Schroeder, Huntingdon Valley, Pa., assignors to Radio Corporation of America, a corporation of Delaware Application August 10, 1955, Serial No. 527,584

12 Claims. (Cl. 178—5.4)

This invention relates to color television transmitters and more particularly to the development of an improved monochrome signal.

The composite color television signal is composed of several signals. One is the monochrome signal which is that part of the composite signal having major control of the luminance or luminosity values of an image whether displayed in color or in monochrome. In addition to the monochrome signal, there is provided a chrominance signal which includes the sidebands of the modulated chrominance subcarrier and contains color difference information signals such as $R-Y$, $G-Y$ and $B-Y$ information signals where R, G, and B represent the component colors red, green and blue and Y relates to the luminance values of the image; the chrominance signal also includes information relating to I and Q signals which describe color difference information along the orange-cyan and green-purple color axes, respectively. The composite color sync signal is also included and comprises all the sync signals necessary for proper operation of the color receiver.

The total frequency band of color television signals extends up to approximately 4½ mcs. to accommodate luminance signal information. Also included in this frequency band is the chrominance signal having the frequency range from approximately 2.2 to 4.2 mcs. and representing modulations indicative of color difference signal components having frequencies up to 1½ mcs. The frequency of the subcarrier on which the chrominance signal is transmitted is 3.58 mcs.

The monochrome signal includes substantially all of the luminance or brightness information in the gray areas of the picture. However, as the color saturation increases, the chrominance signal is caused to carry an increasing amount of the luminance information. Since the chrominance signal has a narrower frequency range, some of the higher frequency luminance information, which would have been carried by the chrominance had the chrominance signal been a wide band signal, is lost. Therefore, in colored regions of reproduced luminance information detail, the luminance transition amplitude is nearly always reproduced with incorrect amplitude and the transition from one amplitude to another often takes place in a "dark surround," that is to say, a dark surrounding area or "hole." The need for an improved monochrome signal has been implicitly suggested in Footnote 21 of the FCC Technical Standards which reads, "Forming of the high frequency portion of the monochrome signal in a different manner is permissible and may in fact be desirable in order to improve the sharpness of saturated colors."

It is an object of this invention to provide an improved monochrome signal.

It is another object of this invention to provide a monochrome signal which will yield an exact reproduction at the receiver of the luminance information as picked up by the camera.

It is a still further object of this invention to provide a monochrome signal which will faithfully reproduce high frequency luminance detail on a color television receiver.

According to the present invention additional low frequency color information is transmitted with the monochrome signal in the luminance channel to cause an accurate reproduction of high frequency luminance detail in colored portions of a televised image.

In one form of the invention an improved monochrome signal is formed by combining low frequency chrominance signal information with a brightness or luminosity information signal and by forming a new signal representing substantially a mathematical root of the aforementioned combined signal.

Other and incidental objects of the invention will become apparent upon a reading of the specification and a study of the drawings wherein.

Before considering the nature of improved monochrome signals proportioned according to the present invention, consider in detail the standard transmitted monochrome signal and its defects. The standard transmitted monochrome signal to be described, does not accurately reproduce high frequency luminance detail in colored portions of a televised image. The present invention will describe the formation of monochrome signals which faithfully reproduce high frequency luminance detail on the image reproducer face of a color television receiver.

Consider first the standard gamma corrected monochrome signal $$E_Y' = a_G E_G^{1/\gamma} + a_R E_R^{1/\gamma} + a_B E_B^{1/\gamma}$$
$$= .59 E_G^{1/\gamma} + .30 E_R^{1/\gamma} + .11 E_B^{1/\gamma} \quad (1)$$

where $E_G$, $E_R$, and $E_B$ are three voltages representing the green, red and blue signals; $1/\gamma$ indicates that gamma correction has been applied and $a_G$, $a_R$, and $a_B$ are the relative luminances of the standard primaries to the eye. The numerical values of the relative luminances have been normalized so that their sum is unity. Gamma is normally assigned a system value of 2.2; however, a value of 2 for gamma does not yield any serious errors since the resulted gamma values of a tri-color kinescope vary from approximately 2 to 2.4. $a_G$, $a_R$, and $a_B$ may assume the typical values 0.59, 0.30, and 0.11 respectively.

In gray areas, $E_Y'$ yields the proper amount of high frequency luminance detail. However, in colored areas, this signal yields either too much or too little high frequency detail. The signal applied to a particular kinescope gun is the sum of the luminance signal and the color difference signal. On the control elements of the "blue" electron gun, for example, the applied signal is, $$E_{Y'} + (E_B^{1/\gamma} - E_{Y'})_L = (E_B^{1/\gamma})_L + (E_{Y'})_H \qquad (2)$$

where the subscripts L and H represent low and high frequencies, respectively. The low frequencies are those frequencies which can be carried in the chrominance channel and the high frequencies correspond to those which can be transmitted through the luminance channel.

The color difference signal contains only low frequency information since it is transmitted in the narrow band chrominance channel. The band width of this channel will accommodate frequencies up to 1½ mc. as compared to the 4.2 mc. of frequency range characteristic of the luminance channel.

Consider the case when $E_{Y'}$ is due solely to a sudden transition in amplitude of the blue information which is provided by the blue channel of a suitable pickup device. If the amplitude of $E_{B_L}^{1/\gamma}$ is very small at the transition, $E_{Y_H'}$ applied to the "blue" gun is compressed by the square-law characteristic of the kinescope, or if $E_{B_L}^{1/\gamma}$ is very large, $E_{Y_H'}$ applied to the "blue" gun is expanded considerably. At only one low-frequency blue-signal amplitude is $E_{Y_H'}$ reproduced correctly in terms of blue light. This non-linear characteristic causes two defects in the reproduction of luminance signal detail at a transition in colored areas:

A. The high frequency components are usually reproduced with improper amplitudes, and B. Each transition is accompanied by a low frequency darkening.

Figure 1A:
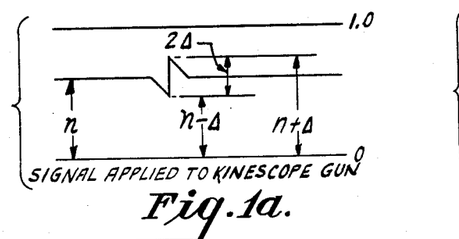
Figure 1A shows a transition type of signal composed of a sharp edge function superimposed on a nonvarying signal.
Figure 1B:
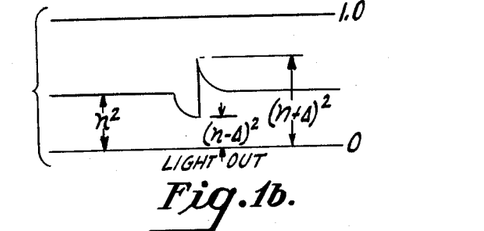
Figure 1B is the corresponding light output in response to the signal shown in Figure 1A.

The defect relating to the fact that high frequency components are usually reproduced with improper amplitudes may be appreciated by considering Figure 1.

Figure 1A shows a signal transition composed of a sharp edge function or transition superimposed on a non-varying signal which is applied to a kinescope gun. The original transition is assumed to have occurred in another primary color. The amplitude of the sharp edge function is $2\Delta$. The transition in light output, as illustrated in Figure 1B, is $$(n+\Delta)^2 - (n-\Delta)^2 = 4\Delta n \qquad (3)$$

where $n$ is the fractional height of the center of the transition applied to the kinescope gun. $\Delta$ is not necessarily a small increment. The amplification of the high frequency transition, resulting from the non-linearity of the kinescope gun is $$\frac{4\Delta n}{2\Delta} = 2n \qquad (4)$$

Therefore, in a three color display device which has high frequency transitions superimposed upon low frequency information, each electron gun will display more than its share of detail if the low frequency information translates the center of the transition to a point more than half way up on the control-voltage-versus-beam-current characteristic curves of the electron gun of the kinescope, and less than its share if the low frequency information does not translate the transition to a point at least half-way up on this characteristic curve. Consequently, transitions where the average luminance is low will be underpeaked and transitions where the average luminance is high will be overpeaked. The underpeaking or overpeaking of the transitions will be described graphically later in the specification; from an analytical standpoint, the high frequency transition as seen by the eye can be expressed as, $$a_R Y_H' 2n_R + a_G Y_H' 2n_G + a_B Y_H' 2n_B \qquad (5)$$

where $Y_H'$ represents the transition. The $n$'s represent the amplitude of the low frequency information at the transition whereby the $2n$'s represent the amplification of the transition due to the non-linearities of the characteristic curve of the electron gun in the kinescope as described by Equation 4.

The increase in high frequencies from original light to reproduced light is indicated by dividing Equation 5 by $Y_H$; i.e.

$$2\left(\frac{Y_H'}{Y_H}\right)(a_R n_R + a_G n_G + a_B n_B) \qquad (6)$$

This expression can vary from zero to infinity; however, in practice, it does not deviate very far from unity. Table 1 lists some transitions.

TABLE 1

| Transition | Highs/Lows | |
|---|---|---|
| Green to yellow | { 1.48 / .52 } | Arithmetic mean=1.00. |
| Yellow to red | 1.19 | Arithmetic mean=1.00. |
| Blue to cyan | .81 | |
| Red to magenta | { .71 / 1.29 } | Arithmetic mean=1.00. |
| Cyan to green | | |
| Red to cyan | 1.00 | Arithmetic mean=1.00. |
| Black to blue | { .11 / 1.89 } | Arithmetic mean=1.00. |
| White to yellow | | |

Table 1 lists the ratios of reproduced luminance detail to initial luminance detail. These ratios are composed in pairs whose arithmetic mean is unity. Note that the transition from red to cyan is exactly unity. This is because this transition is from a color to its complement. In using Equation 6, it is assumed that the kinescopes can deliver negative light; this assumption does not introduce any serious errors.

Many observers of reproduced television images have concluded that the "softness" of a reproduced picture in colored areas is due to the fact that part of the luminance information is carried by the chrominance channel which is narrow band and which discards any high frequency information applied to it. This has been substantiated experimentally by observing transitions from black to a color. However, it has not been generally recognized that a transition from white to a particular color is over peaked the same amount that a transition from black to a complement of that particular color is under peaked.

Figures 2A, 2B, 2C, 2D:
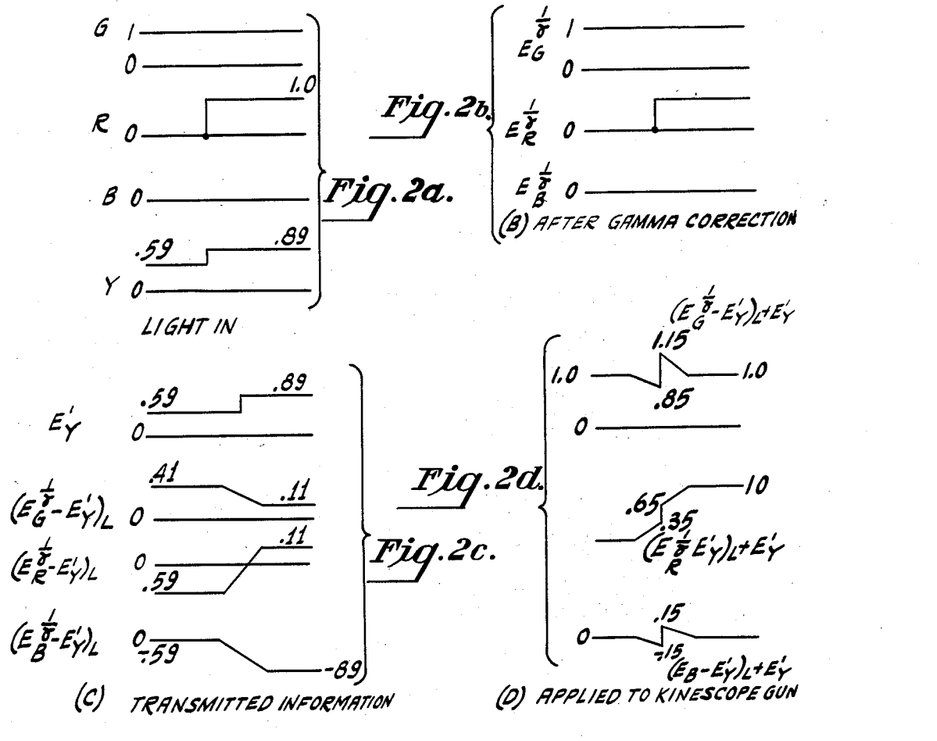
Figures 2a to 2f inclusive illustrate all possible stages of a green-to-yellow transition from light into the camera to the light output of the kinescope.

The second defect in the proper reproduction of high frequency luminance detail arises from the fact that at every transition of color, the entire luminance transition is in a "dark surround". This can be explained by reference to Figure 2 which describes a green-to-yellow transition. Figure 2A shows the transition in the original scene in terms of the light-in. It is seen from Figure 2A that at the transition the red light changes from zero to unity with green light at unity before and after the transition; the monochrome signal Y changes at the transition from a value of .59 to .89.

Figure 2B shows the waveforms of Figure 2A after gamma correction.

Figure 2C illustrates transmitted information relating to the transition described by the variations in light of Figure 2A. The color difference signal transitions have been drawn as sloping lines to indicate that only low frequencies are present.

Figure 2D shows the resulting combined waveforms wherein each of the transmitted color difference signals are added to the luminance information; these combined waveforms represent the color information applied to each of the electron guns of the kinescope.

Figure 2E:
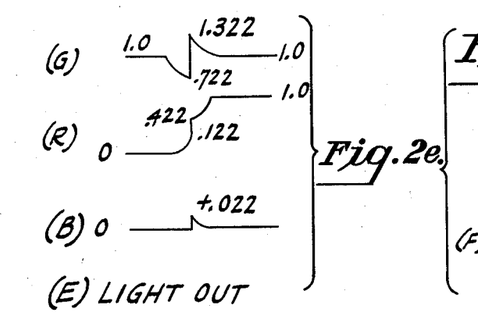

Figure 2E shows waveforms describing the component-color-light output of the kinescope. The straight sloping lines are now curved resulting from the square law characteristic curves of the electron guns of the kinescope.

Figure 2F:
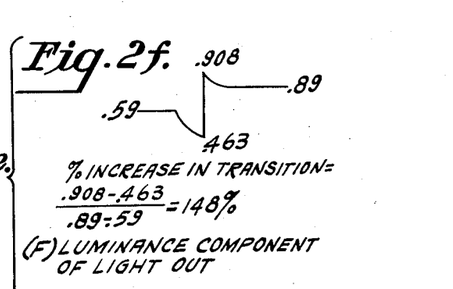

Figure 2F shows the output luminance information. Comparing the luminance information of Figure 2A with that shown in Figure 2F, it is seen that the steep transition has been increased by 148% as has been previously prescribed by Table 1, but the center of the transition is at .69 rather than at .74; that is to say, the transition is in a "dark surround" or "hole." Note that the transition is not symmetrically placed. It appears to be in a "hole," since there is more undershoot than there is overshoot. This is due to the kinescope non-linearities. Even a red to cyan transition which has the proper ratio of high frequencies to low frequencies is in a "hole." These "holes" can be observed by looking at the color bars on a standard receiver, for example. They are altered, of course, by the cut-off transients due to, for example, low-pass I and Q filters. Transitions which are changes mainly of Q will have wider "holes" than transitions which are changes mainly of I; the former transitions will be more noticeable than the latter.

According to the present invention, an improved monochrome signal which will exactly reproduce the original luminance detail at the color television receiver is one wherein a prescribed amount of low frequency color signal information is combined with selected components of "linear" luminance or "true" luminance signal information, that is, a luminance signal which has exclusive control of the luminance of a picture. Several forms of improved monochrome signals of the present invention will be described in the following specification; these signals will be catagorized as improved monochrome signals A, B, C, and D.

*Improved monochrome signal A*

Consider now the derivation of an expression for a monochrome signal which contains the proper distribution of high frequencies. Equation 5, which represents the amount of high frequency information seen by the eye, may be rewritten as $$2E_{Y_H}'[a_G n_G + a_R n_R + a_B n_B] = 2E_{Y_H}' E_{Y_L}' \qquad (7)$$

This expression represents the multiplication of the transmitted high frequencies by $2E_{Y_L}'$. Since the original scene luminance is the linear combination of $E_{Y_L}$ and $E_{Y_H}$, and since the original $E_{Y_L}$ is not distorted, the high frequency luminance signal that is transmitted should be the linear $E_{Y_H}$ divided by $2E_{Y_L}'$. Denoting the transmitted monochrome signal as $E_{Y_T}$, we get for improved luminance signal A, $$E_{Y_T} = E_{Y_L}' + \frac{E_{Y_H}}{2E_{Y_L}'} \qquad (8)$$

Equation 8 will yield the proper amount of high frequencies in the reproduced light provided by a color television receiver. However, this signal does not completely correct for the "darkening."

There are three approximations involved in Equation 8: namely, (1) gamma equals two, (2) kinescopes can deliver negative light, and (3) since I and Q differ in cutoff frequencies $E_{Y_L}'$ can be only approximately correct for frequencies in between these two cutoff frequencies.

Figure 3:
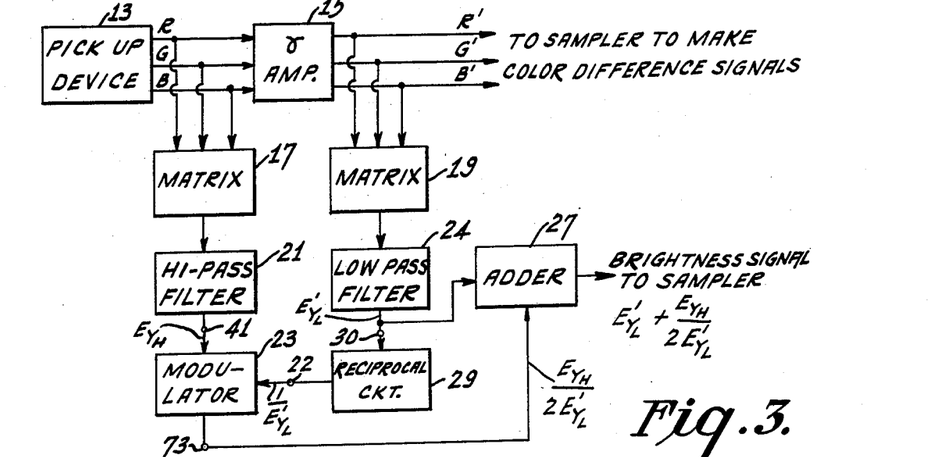
Figure 3 is a block diagram of a circuit utilized in one form of the present invention.

Figure 3 is a block diagram of a circuit which will develop the transmitted monochrome signal described by Equation 8. The pickup device 13 produces red, green and blue component color signals denoted as $E_R$, $E_G$ and $E_B$; these signals are impressed on each of two circuits. One is the gamma amplifier 15. The second circuit is the matrix 17. The gamma amplifier 15 produces gamma corrected red, green and blue signals, namely, $E_R^{1/\gamma}$, $E_G^{1/\gamma}$, and $E_B^{1/\gamma}$. These gamma corrected component color signals are supplied to both the samplers to form suitable color difference signals and to the matrix 19.

Matrix 17 forms a luminance signal utilizing the linear or non-gamma corrected component color signals; matrix 19 forms a monochrome signal $E_Y'$ utilizing the gamma corrected component color signals. The non-gamma corrected luminance signal is passed through the high pass filter 21 to develop a signal constituting the higher frequencies of the non-gamma corrected luminance signal. This signal is designated as $E_{Y_H}$, and is impressed on the modulator circuit 23. The lower frequencies of the monochrome signal provided by the matrix 19 are filtered from this signal by the low pass filter 24 to produce the signal $E_{Y_L}'$ which has a bandwidth substantially that of the color difference signal information. $E_{Y_L}'$ is applied to both the adder 27 and also to the reciprocal circuit 29 by way of terminal 30.

The reciprocal circuit 29 develops a term of the type $$\frac{1}{E_{Y_L}'}$$

from the impressed signal $E_{Y_L}'$.

Figure 4:
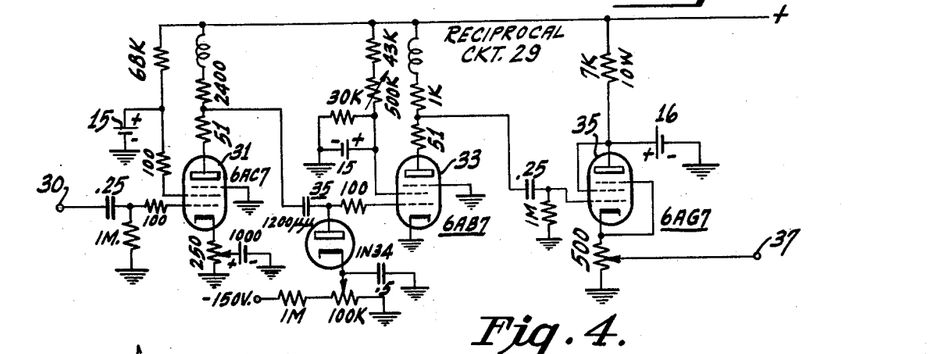
Figure 4 is a schematic diagram of the reciprocal amplifier circuit of Figure 3.

A typical reciprocal circuit is shown in schematic form in Figure 4 wherein the impressed signal $E_{Y_L}'$ is applied to the control grid of the tube 31. This signal is amplified by tube 31 and applied to the control grid of the 6AB7 tube 33; the diode clamp circuit is utilized to establish the control grid bias of the 6AB7 tube 33.

Figure 5:
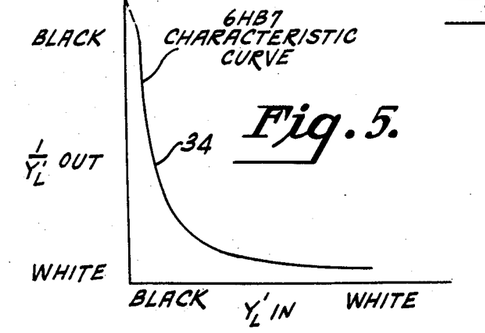
Figure 5 shows a typical reciprocal type of transfer characteristic curve.

The 6AB7 tube 33 of Figure 4 has a transfer characteristic curve 34 of the type shown in Figure 5, that is to say, a reciprocal of the applied signal is formed with the applied signal $E_{Y_L}'$ transformed into its reciprocal, namely, $$\frac{1}{E_{Y_L}'}$$

This reciprocal signal is amplified by the tube 35 and delivered to the output terminal 37 which, in the case of the block diagram of Figure 3, is coupled to the modulator 23.

Figure 6:
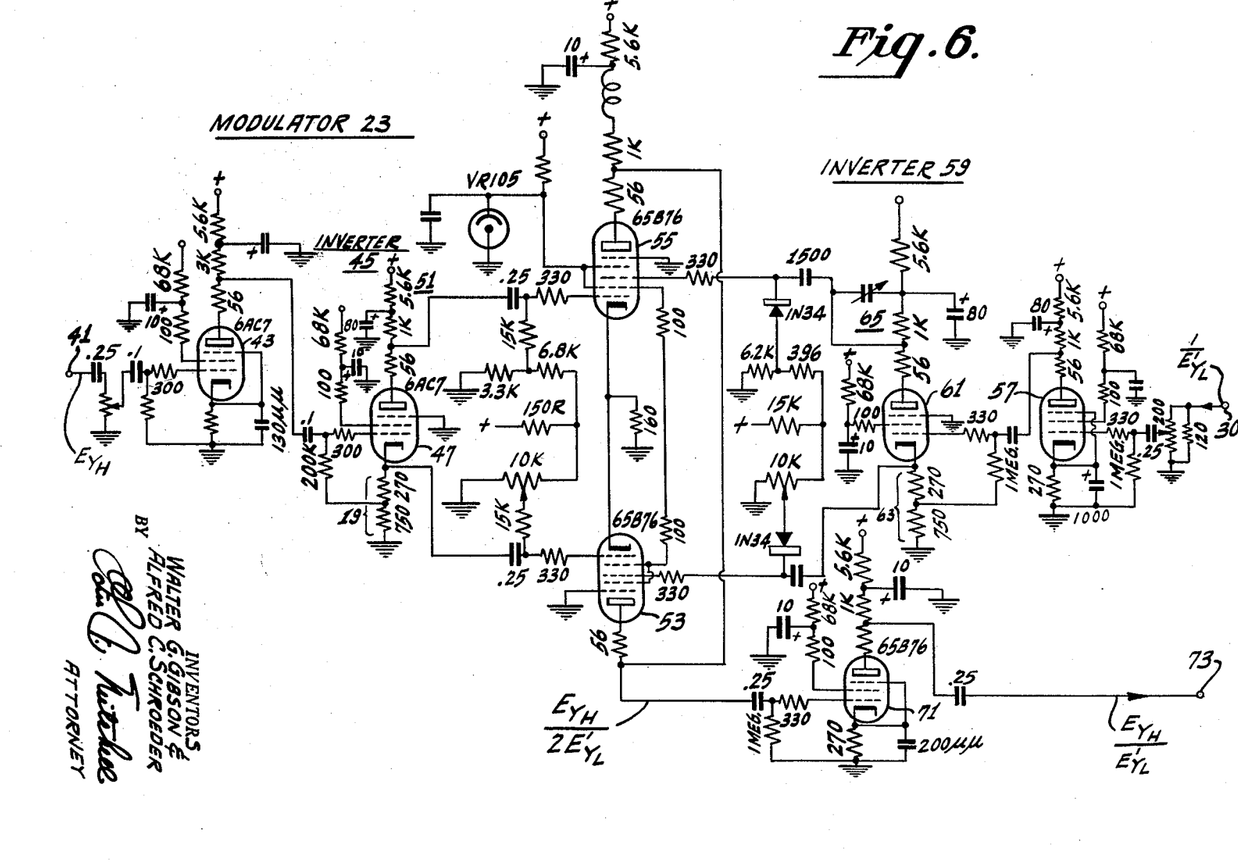
Figure 6 is a schematic diagram of a modulator of Figure 4.

The modulator 23 of Figure 3 is illustrated by the representative circuit shown in schematic diagram form in Figure 6. $E_{Y_H}$ is applied to the input terminal 41 of the modulator 23. This signal is amplified by the tube 43 and applied to the inverter circuit 45. The inverter circuit 45 involves a tube 47 having both a cathode resistor 49 and an anode load 51. The signal developed across the cathode resistor 49 is applied to the control grid of the modulator tube 53; the signal developed across the anode load 51 is applied to the control grid of the modulator tube 55. The reciprocal signal $1/E_{Y_L}'$ is in turn applied from the terminal 30 to the control grid of the tube 57 where it is amplified and utilized to drive the inverter 59. The inverter 59 utilizes the tube 61 having the cathode resistor 63 and the anode load 65. The reciprocal signal developed in one polarity across the cathode resistor 63 is applied to a second control grid of the modulator 53. The signal developed across the anode load 65 is applied to a second control grid of modulator tube 55. The outputs of modulator tubes 53 and 55 are coupled together to provide a combined signal of the form $$\frac{E_{Y_H}}{2E_{Y_L}'}$$

This quotient signal is amplified in the amplifier tube 71 and applied to the output terminal 73 from which output terminal it is applied to the adder 27.

The adder 27 adds together the quotient signal provided by the modulator 23 and the signal $E_{Y_L}'$ to thereupon form the signal described by Equation 8.

*Improved monochrome signal B*

Another form of an improved monochrome signal, $E_{Y_T}$, which provides a more exact reproduction at the receiver of $E_Y$ as seen by the camera, is derived as follows:

The signal applied to any kinescope gun is the proper color difference signal plus monochrome signal. These are, Green gun: $(E_G' - E_Y')_L + E_{Y_T}$ (9)

Red gun: $(E_R' - E_Y')_L + E_{Y_T}$ (10)

Blue gun: $(E_B' - E_Y')_L + E_{Y_T}$ (11)

These above quantities are squared and added as their relative luminances to obtain the brightness signal in light.

$$E_Y = a_G\{[(E_G' - E_Y')_L]^2 + 2E_{Y_T}[(E_G' - E_Y')_L] + E^2_{Y_T}\}$$
$$+ a_R\{[(E_R' - E_Y')_L]^2 + 2E_{Y_T}[(E_R' - E_Y')_L] + E^2_{Y_T}\}$$
$$+ a_B\{[(E_B' - E_Y')_L]^2 + 2E_{Y_T}[(E_B' - E_Y')_L] + E^2_{Y_T}\} \quad (12)$$

$$E_Y = a_G[(E_G' - E_Y')_L]^2 + a_R[(E_R' - E_Y')_L]^2 \quad (13)$$
$$+ a_B[(E_B' - E_Y')_L]^2 + 2E_{Y_T}[a_G(E_G')_L + a_R(E_R')_L$$
$$+ a_B(E_B')_L - (E_Y')_L] + (a_G + a_R + a_B)E^2_{Y_T}$$

The coefficient of $2E_{Y_T}$ is zero. The coefficient of $E^2_{Y_T}$ is unity. Rearranging, $$E_{Y_T} = (E_Y - \{a_G[(E_G' - E_Y')_L]^2 + a_R[(E_R' - E_Y')_L]^2 + a_B[(E_B' - E_Y')_L]^2\})^{1/2} \quad (14)$$

Improved luminance signal B may thereupon be written in the form

B $$E_{Y_T} = [E_Y - \{.59[(E_G' - E_Y')_L]^2 + .30[(E_R' - E_Y')_L]^2 + .11[(E_B' - E_Y')_L]^2\}]^{1/2} \quad (15)$$

where $$E_Y = E_{Y_L} + E_{Y_H} \quad (16)$$

An improved monochrome signal, according to Equation 15, provides the right size transition in the reproduction of $E_Y$ at the receiver and the transition is not caused to be sitting in a "hole."

Figure 7:
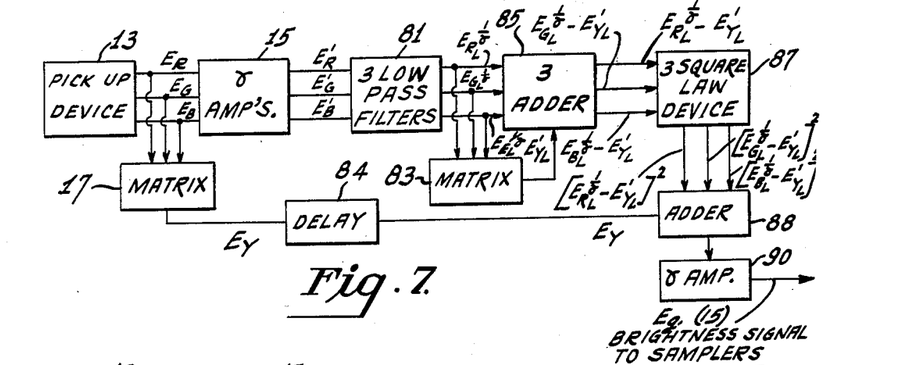
Figures 7, 10 and 11 are block diagrams of other forms of the present invention.

The block diagram of Figure 7 illustrates one circuit for forming the monochrome signal of Equation 15. The pickup device 13, the gamma amplifiers 15 and the matrix 17 function as described in connection with the circuit of Figure 3. The output signals of the gamma amplifiers 15, namely the $E_R^{1/\gamma}$, $E_G^{1/\gamma}$, and $E_B^{1/\gamma}$ signals, are passed through three low pass filters 81 to provide the low frequency signals $E_{R_L}'$, $E_{G_L}'$ and $E_{B_L}'$. These low frequency signals are matrixed in the matrix 83 to form the monochrome signal $E_{Y_L}'$. This is the gamma corrected low frequency monochrome signal which is in turn applied to the three adders 85, in addition to the signals $E_{R_L}^{1/\gamma}$, $E_{G_L}^{1/\gamma}$ and $E_{B_L}^{1/\gamma}$ to form color difference signals of the type, for example, $E_{G_L}^{1/\gamma} - E_{Y_L}'$, $E_{R_L}^{1/\gamma} - E_{Y_L}'$ and $E_{B_L}^{1/\gamma} - E_{Y_L}'$. These color difference signals are thereupon applied to three square law devices 87 to provide signals which are the squares of these terms as specified by Equation 15. A typical square law device which may be utilized as one of the three square law devices 87 is shown in schematic diagram in Figure 8. The incoming signal is applied to the control grid of the tube 91. Coupled to this control grid is the clamp circuit 93 which is of the double diode type and is used to reinsert a D.C. level. Since the square of a negative number is a positive number, a parabolic transfer characteristic of the overall circuit is required. This is achieved as follows: The resistors 93, and 95 which function as the plate resistor and cathode resistor to the tube 91 are equal so that the signals on the plate and cathode of tube 91 are equal in magnitude but opposite in polarity. These signals are applied respectively to the diodes 97 and 99 which are biased to clip the negative portion of the signal applied to each. Being square law diodes, they also develop the "square" of any signal developed across them. The squared signals formed by the diodes are thereupon added at the output terminal 100.

Figure 8:
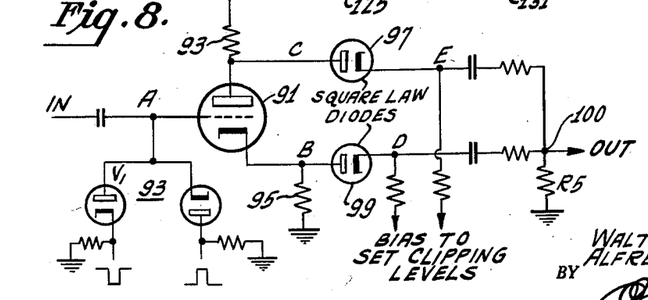
Figures 8 and 9 are diagrams relating to a square law circuit and typical waveforms produced by this circuit.
Figures 9, 11:
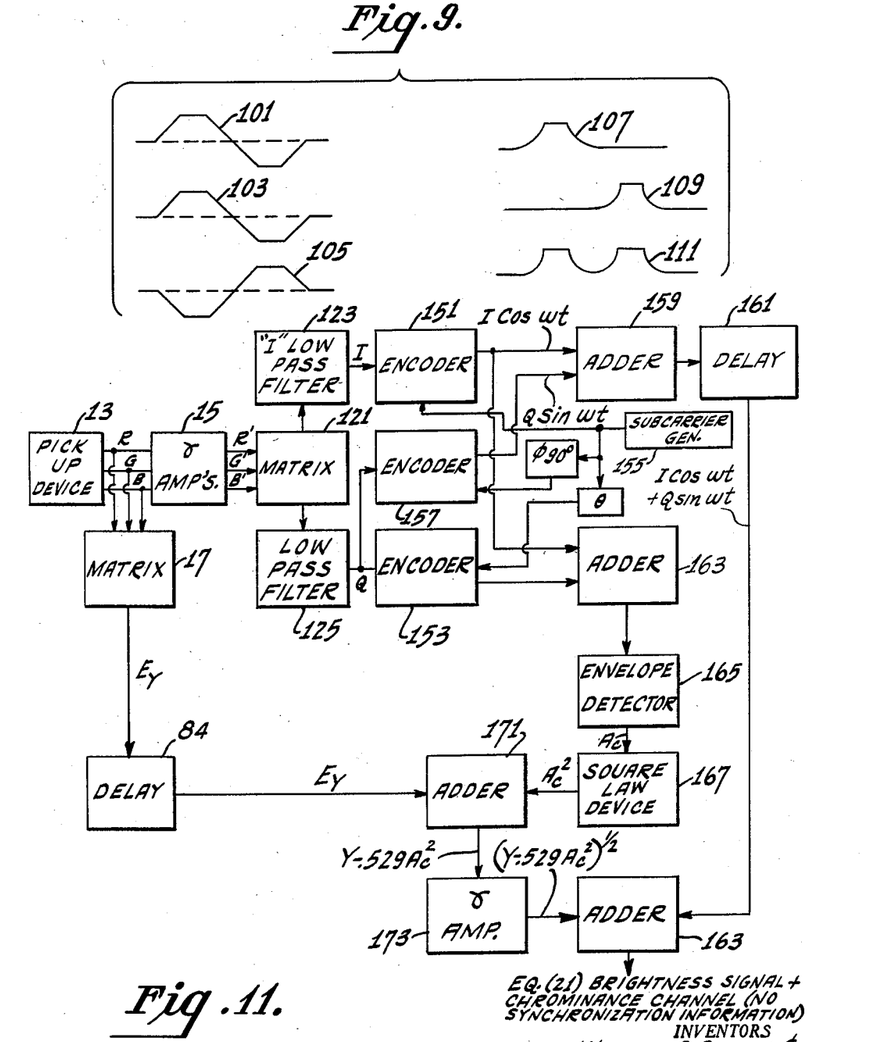

The waveforms of Figure 9 illustrate the effect of passing a waveform of the type 101 through the circuit of Figure 9. The waveform 103 is developed across the cathode resistor 95. This waveform is of the same polarity as is the applied waveform. The waveform 105 is developed across the plate resistor 93 and is seen to be of opposite polarity to the waveform developed across the cathode resistor 95. The squared clipped waveforms 107 and 109 are thereupon developed across the diodes 99 and 97 respectively with the waveform 111 representing the sum of these two signals at the output terminal 100.

Returning to the block diagram of Figure 7, the "squared" low frequency color difference signals are added to the luminance signal $E_Y$ in the adder 88 with the resultant combined signal applied to the gamma amplifier 90. The gamma amplifier 90 provides the function of taking the mathematical square root of the combined signal to form the signal described by Equation 15.

*Improved monochrome signal C*

The improved monochrome signal of Equation 15 does not account for the different cut-off frequencies of the I and Q signals. A more exact improved monochrome signal accounting for these different cut-off frequencies may thereupon be developed from Equation 15 utilizing the well known equivalent expression between color difference signals and I and Q signals, namely:

$$E_G^{1/\gamma} - E_Y' = -.280\ I - .632\ Q \quad (17)$$
$$E_R^{1/\gamma} - E_Y' = .958\ I + .622\ Q \quad (18)$$
$$E_B^{1/\gamma} - E_Y' = -1.106\ I + 1.702\ Q \quad (19)$$

This substitution yields improved luminance signal C:

C $$E_{Y_T} = (E_Y - [.456\ I^2 + .152\ IQ + .672\ Q^2]^{1/\gamma})^{1/2} \quad (20)$$

The improved monochrome signal is expressed by Equation 20 provides more exact reproduction of transitions than either of the improved monochrome signals discussed thus far; as previously mentioned, it also takes into consideration the different bandwidths of I and Q signals; a Q signal has a frequency range from substantially 0 to ½ mc. and the I signal has a frequency range from substantially 0 to 1½ mcs.

Figure 10:
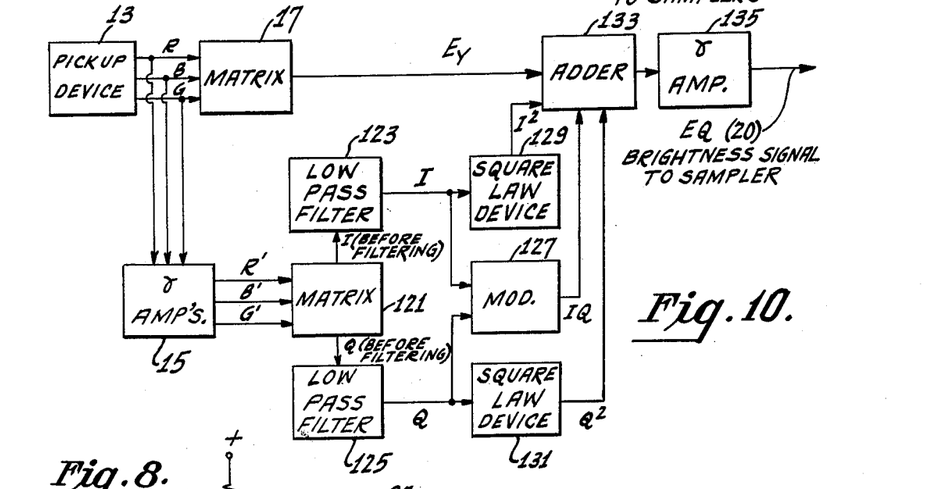

Figure 10 is a block diagram of a circuit which may be utilized for forming the improved monochrome signal of Equation 20. As in the case of the circuit of Figure 8, gamma amplifiers 15 and matrix circuit 17 are utilized to develop a luminance signal $E_Y$ and a trio of gamma corrected component color signals, namely, R', B' and G' from the pickup device 13. The R', B' and G' signals are applied to the matrix 121 where using matrixing proportions described by Gloystein and Turner in their article entitled "The Color-Plexer" as published in the January 1954 issue of the I.R.E., I and Q signals are developed. The I signal is passed through the low pass filter 123 having a pass band from 0 to 1½ mcs. The Q signal is passed through the low pass filter 125 which has a pass band from 0 to ½ mc. The I and Q signals are thereupon applied to the modulator 127 to form a product signal IQ. The modulator 127 may be of the form illustrated in Figure 6. The I and Q signals are independently applied to the square law devices 129 and 131 to form signals of the type $I^2$ and $Q^2$. The signals $I^2$, $Q^2$ and IQ are applied in proper magnitude to the adder circuit 133 where they are combined with the luminance signal $E_Y$. The resulting combined signal is applied to the gamma amplifier 135 which is adjusted to provide the square root according to the Equation 20.

*Improved monochrome signal D*

Another improved monochrome signal which will give accurate reproduction of luminance transition information may be derived by writing the terms on the right hand side of Equation 14 in terms of $E_R$, $E_G$, and $E_B$. Such a resulting expression may then be developed in to the improved monochrome signal D; i.e.

D $$E_{Y_T} = (E_Y - .529 A_c^2)^{1/2} \quad (21)$$

This form of improved monochrome signal will yield an exact reproduction of high frequency detail based on the practical assumptions that the system gamma is 2 rather than 2.2 and that the kinescopes can deliver negative light. The term $E_Y$ refers to the "linear" luminance signal; that is to say, a true luminance signal which has not been gamma corrected. The term $A_c$ describes color difference information. $A_c$, for example, can be obtained by encoding $E_I^{1/\gamma}$ and $E_Q^{1/\gamma}$ at the proper angle and amplitudes. For example, $E_I^{1/\gamma}$ is multiplied by the factor .925 and $E_Q^{1/\gamma}$ is multiplied by the factor 1.135. Upon formation of a chrominance signal utilizing the aforementioned amplitude-corrected values of $E_I^{1/\gamma}$ and $E_Q^{1/\gamma}$, $E_I^{1/\gamma}$ is caused to lead $E_Q^{1/\gamma}$ in the chrominance signal by 82.1° rather than 90°. This will provide a so-called "circular" chrominance subcarrier. Detection or rectification of the "circular" chrominance subcarrier will yield $A_c$.

A circuit for developing an improved monochrome signal of the type described by Equation 21 is shown in block diagram in Figure 11. Circuits having the same functions as those utilized in previous monochrome signal forming circuits are provided the same numerals as those assigned in the previously described circuits.

The I signal, after filtering by the low pass filter 123, is applied to the encoder 151 which receives a subcarrier signal from the subcarrier generator 155 and develops an I-signal-modulated subcarrier referred to in the Figure 11 as $I \cos \omega t$.

The Q signal, after being filtered by the low pass filter 125, is applied simultaneously to the encoders 153 and 157. The encoder 157 receives a subcarrier signal shifted 90° in phase from that applied to the encoder 151. A Q-signal-modulated subcarrier, referred to in Figure 11 as $Q \sin \omega t$, is thereupon applied to the adder 159 to which is also applied the I signal modulated subcarrier. The adder thereupon forms a chrominance signal which is delayed in the delay line 161 and applied to the adder 163. This chrominance signal is one form of chrominance signal utilized in color television transmission.

The encoder 153 receives the filtered Q signal and a phase shifted subcarrier signal from the subcarrier generator 155. The shift in phase is such as to provide a subcarrier which lags the subcarrier supplied to the encoder 151 by 82.1° rather than by 90° as in the standard chrominance signal. The output of encoders 153 and 151 are thereupon added in proper proportions in the adder 163 to form the previously described "circular" chrominance signal. This "circular" chrominance signal is detected by the envelope detector 165 to develop a signal previously referred to as $A_c$. The signal $A_c$ is thereupon squared in the square law device 167 to form the term $A_c^2$. The signal $A_c^2$ and the luminance signal $E_Y$ which is delayed by the delay line 84 are thereupon added in the adder 171. The output of the adder 171 is applied to the gamma amplifier which is adjusted to develop a signal representing the square root of the signal delivered by the adder 171. This is the signal described in the Equation 21 and is an improved monochrome signal which will provide an exact reproduction of luminance signal transitions at the receiver thereby exactly reproducing the original luminance detail. The improved monochrome signal provided by the gamma amplifier 173 is thereupon added to the chrominance signal in the adder 163 to form a composite color television signal which does not include, at this point, synchronizing information.

In order to compare transitions reproduced from the standard monochrome signal (expressed as $E_Y'$ and described by Equation 1, and from the improved monochrome signal of Equation 21, a magenta to quarter level green transition has been calculated at six different points: start and finish of the low frequency chrominance transition (assuming $E_I^{1/\gamma}$ and $E_Q^{1/\gamma}$ to have equal bandwidths for simplicity of analysis) start and finish of the luminance transition (assumed infinitely faster than the chrominance transition for simplicity of analysis), and points half way between the start (and finish) of the chrominance transition and the start (and finish) of the luminance transition. These calculations have been performed for both monochrome signals.

Figure 12A:
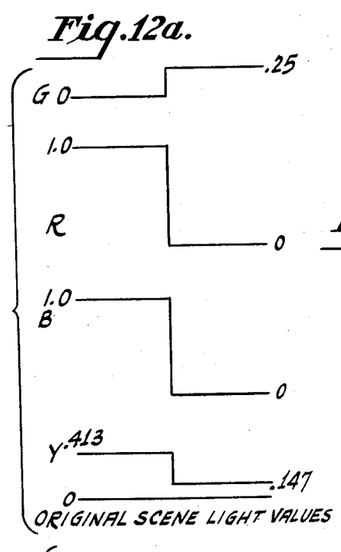
Figures 12a to 12d inclusive illustrate a typical transition of light values at a camera, the transmitted information therefor using this invention, and a comparison of the reproduced luminance produced by a standard monochrome signal and an improved monochrome signal of this invention.

The standard system using $E_Y'$ will be considered first. The chosen green, red, and blue light values and the original scene luminance value that they generate are shown in Figure 12A.

Figure 12B:
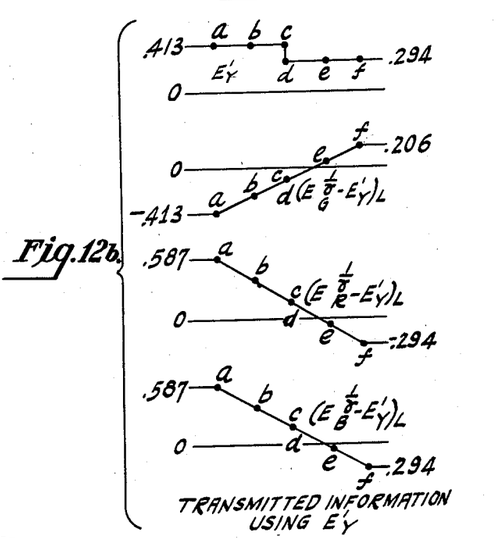

After gamma correction, matrixing, and low pass filtering of chrominance components, the transmitted information is (remembering that gamma correction changes $E_G = .25$ to $E_G^{1/\gamma} = .50$) as shown in Figure 12B.

At the receiver, the monochrome signal is added to each color difference signal and the sum is applied to the appropriate gun which squares the information and converts it into light. The three light signals are then added according to their relative luminance to provide the reproduced luminance transition. The results of the calculations which are illustrated as points in Figure 12B, are tabulated below:

*Transmitted information*

|   | $E_{Y'}$ | $E_G^{1/\gamma} - E_{Y_{L'}}$ | $E_R^{1/\gamma} - E_{Y_{L'}}$ | $E_B^{1/\gamma} - E_{Y_{L'}}$ |
|---|---|---|---|---|
| a | .413 | −.413 | .587 | .587 |
| b | .413 | −.258 | .367 | .367 |
| c | .413 | −.104 | .146 | .146 |
| d | .294 | −.104 | .146 | .146 |
| e | .294 | .051 | −.074 | −.074 |
| f | .294 | .206 | −.294 | −.294 |

Figure 12C:
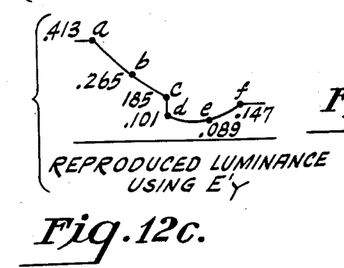

The reproduced luminance using $E_Y'$ is illustrated in Figure 12C; the results of the calculations for the points a–f are tabulated as follows:

|   | Relative Luminance | | | Reproduced Luminance |
|---|---|---|---|---|
|   | .587G | .299R | .144B |   |
| a | .000 | .299 | .114 | .413 |
| b | .014 | .182 | .069 | .265 |
| c | .056 | .093 | .036 | .185 |
| d | .021 | .058 | .022 | .101 |
| e | .070 | .014 | .005 | .089 |
| f | .147 | .000 | .000 | .147 |

The transition is in a "dark surround" and its peak-to-peak amplitude has been reduced to 31.6% of its original value.

The results of calculations for reproduced luminance using $E_{Y_T}$ are tabulated as follows for the points a–f:

|   | Relative Luminance | | | Reproduced Luminance |
|---|---|---|---|---|
|   | .587G | .299R | .114B |   |
| a | .000 | .299 | .114 | .413 |
| b | .055 | .259 | .099 | .413 |
| c | .163 | .181 | .069 | .413 |
| d | .039 | .077 | .030 | .146 |
| e | .108 | .028 | .010 | .146 |
| f | .147 | .000 | .000 | .146 |

Figure 12D:
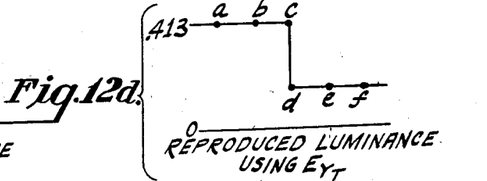

These points for reproduced luminance are shown in Figure 12D where it is seen that the transition is accurately reproduced.

Having thus described the invention, what is claimed is:

1. Apparatus for developing an improved monochrome signal comprising in combination, first means for developing a signal representative of the brightness of an image, second means for developing color difference information signals representative of color information corresponding to said image, third means coupled to said second means to develop a signal representative of said color difference information signals raised to a mathematical power, means coupled to said first and third means to combine said brightness representative signal and said raised-in-power color difference information signals, and means to develop a signal representative of a mathematical root of said combined signals, said last-named signal comprising said improved monochrome signal.

2. In a color television transmission system, the combination of, means to develop a first signal representative of higher frequency information relating to the brightness of an image, means to develop a second signal representative of low frequency brightness information relating to said image, means coupled to said first and second signal developing means to develop a signal representing the quotient of prescribed magnitudes of said first and second signals, and means coupled to said second and quotient signal developing means to add said second signal and said quotient signal to provide an improved monochrome signal.

3. In a color television transmission system, the combination of, first means to develop a first signal representative of higher frequency information relating to the luminosity of an image, second means to develop a second signal representative of gamma corrected low frequency brightness information relating to said image, means coupled to first and second means to form a signal representative of the quotient of prescribed magnitudes of said first and second signals, and means to add said second signal and said quotient representative signal to provide an improved monochrome signal.

4. Apparatus for developing an improved monochrome signal comprising in combination, a source of component color information signals, means coupled to said source to develop a signal representative of luminosity information represented by said component color information signals, means coupled to said source for developing color difference information signals from said component color signals, means to raise each of said color difference information signals to a mathematical power of 2, means to add prescribed amplitudes of said raised-in-power color difference information signals, means to subtract said added color raised-in-power difference information signals from said first signal to form a combined signal, and means to develop a signal representative of the square root of said combined signal to provide said improved monochrome signal.

5. Apparatus for developing an improved monochrome signal comprising in combination, means to develop a source of component color information signals, means coupled to said source to develop a signal representative of luminance information represented by said component color information signals, means coupled to said source for developing color difference information signals from said component color signals, means to raise each of said color difference information signals to a mathematical power, means to add prescribed amplitudes of said raised-in-power color difference information signals, means to combine said added raised-in-power color difference information signals from said first signal to form a combined signal, and means to develop a signal representative of a root of said combined signal to provide said improved monochrome signal.

6. In a color television system, the combination of, signal developing means for providing component color information signals representative of an image, means coupled to said signal developing means to produce a luminance signal indicative of the brightness of said image, means coupled to said signal developing means to produce at least a pair of color difference information signals relating to said image, means to form a signal representative of the product of each of said pair of color difference information signals, means to form a pair of signals representative of the mathematical squares of each of said color difference information signals, means to subtract said product signal and said mathematical-square representative signals from said luminosity representative signals to form a combined signal, and means to develop a signal representative of the mathematical square root of said combined signal to thereby form an improved monochrome signal.

7. In a color television system, the combination of, signal developing means for providing component color information signals representative of an image, means coupled to said signal developing means to produce a luminosity representative signal indicative of the brightness of said image, means coupled to said signal developing means to produce at least a pair of color information signals relating to said image, means to form a signal representative of a combination of said pair of color information signals, means to form a pair of signals representative of a mathematical power of each of said color information signals, means to combine said combined signal and said mathematical power representative signals from said luminosity representative signals to form a combined signal, and means to develop an improved monochrome signal representative of a mathematical root of said combined signal.

8. In a color television transmitter for transmitting a colored image, apparatus for developing an improved monochrome signal comprising in combination, means to developing a first signal representative of the luminosity of said colored image, means to develop I and Q signals representative of color difference information related to said image, said I and Q signals representing color difference signal information along an orange-cyan color axis and along a green-purple color axis, respectively, as derived from the colors of said color image, means to form a "circular" chrominance subcarrier comprising a subcarrier modulated by said I and Q signals and wherein the information relating to said I signal is caused to lead information relating to said Q signal in phase by substantially 82°, means to detect the envelope of said "circular" chrominance subcarrier, means to develop a signal representative of the mathematical square of said envelope representative signal, means to subtract said signal representative of said mathematical square from said signal representative of said luminosity information to form a combined signal, and means to develop said improved monochrome signal representative of the mathematical square root of said combined signal.

9. In a color television system, the combination of: first means to develop a plurality of wideband color information signals representative of a colored image; second means coupled to said first means to develop a narrow band chrominance signal comprising a modulated subcarrier including color information representative of the chromaticity of said colored image and also of brightness information representative of said colored image in regions of higher saturation of said image, said brightness information included in said chrominance signal having components occurring only in said narrow band of said chrominance signal; third means coupled to said first means to develop a second signal having a bandwidth substantially larger than the narrow band of said chrominance signal and comprising wideband brightness signal components related to said color image, said last-named signal representative of the total brightness of said colored image in regions of low color saturation and representative of a reduced amount of brightness information in regions of increased color saturation, the brightness components not carried by said last-named signal in regions of increased saturation and excluded therefrom by the narrow band of said chrominance signal in said regions of increased saturation constituting a first group of components representing excluded brightness information; fourth means coupled to said first and second means to develop a third signal which when combined according to prescribed signal combination with said second signal produces a brightness signal which includes said first group of components in regions of higher saturation of said colored image, and means coupled to said third and fourth means to develop an improved brightness signal representing the total brightness of said colored image and including said group of components in regions of increased saturation.

10. In a color television system, the combination of: first means to develop a plurality of wideband color information signals representative of a color image; second means coupled to said first means to develop a first wideband signal having a first frequency band and a first narrow band signal having a second and substantially smaller frequency band both representing in combination the brightness components of said colored image, said second frequency band existing in said first frequency band, said first narrow band signal including an increased proportion of said brightness components in regions of increased color saturation of said colored image, said increased proportion of brightness components in said first narrow band signal resulting in the exclusion from said first narrow band signal and therefore the loss therefrom of brightness components which occur in said first frequency band but not in said second frequency band; third means coupled to said second means to develop a second narrow band signal including colored image components occurring in a third frequency band not coinciding with said second frequency band but also occurring in said first frequency band, said second narrow band signal capable of being combined according to a prescribed combination of signals with said first wideband signal to produce an improved wideband signal representing the brightness components of said colored image and including said brightness components excluded from said first narrow band signal by the narrow bandwidth of the second frequency band of said first narrow band signal, and means coupled to said second and third means to combine said first wideband signal and said second narrow band signal according to said prescribed combination of signals to produce said improved wideband signal.

11. In a color television system, the combination of: first means to develop a plurality of wideband color information signals representative of a color image, second means coupled to said first means to develop a first wideband signal having a first frequency band and a narrow band chrominance signal having a second and substantially smaller frequency band both representing substantially the total brightness information of said colored image, said second frequency band existing in a higher frequency region of said first frequency band, said narrow band chrominance signal including an increased proportion of the total number of brightness components representing said brightness information in regions of increased color saturation of said colored image, said increased proportion of the total brightness components in said narrow band chrominance signal resulting in the exclusion from said chrominance signal and therefore the loss of brightness components which occur in said first frequency band but not in said second frequency band from said narrow band chrominance signal, third means coupled to said second means to develop narrow band color information components occurring in a third frequency band not coinciding with said second frequency band but also occurring in a lower frequency range in said first frequency band, said narrow band color information components capable of being combined according to a prescribed combination of signals with said first wideband signal to produce an improved wideband signal representing the total brightness information of said colored image and including said brightness components excluded from said narrow band chrominance signal by the narrow bandwidth of the second frequency band of said narrow band chrominance signal, and means coupled to said second and third means to combine said first wideband signal and said narrow band color information components according to said prescribed combination of signals to produce said improved wideband signal.

12. In a color television transmitter, the combination of: first means to develop a luminance signal representative of the brightness of a color image, second means coupled to said first means to derive high selected high frequencies of said luminance signal, third means coupled to said first means to gamma correct said luminance signal, fourth means coupled to said third means to derive components from a selected low frequency range of said gamma corrected luminace signal, fifth means coupled to said second and fourth means to develop a signal representative of a prescribed magnitude of the quotient of said high frequencies of said luminance signal and said lower frequency range of said gamma corrected luminance signal, and means coupled to said fourth and fifth means to add the signals developed therein whereby to provide an improved luminance signal.

References Cited in the file of this patent

UNITED STATES PATENTS

| | | |
|---|---|---|
| 2,318,197 | Clark | May 4, 1943 |
| 2,644,030 | Moore | June 30, 1953 |
| 2,713,607 | Rhodes | July 19, 1955 |
| 2,715,155 | Bryan | Aug. 9, 1955 |

FOREIGN PATENTS

A Two-Color Direct-View Receiver for the RCA Color Television System, November 1949.

Color Television Receiver Practice, chapter 5, Rider Publication, March 1955.